United States Patent
Loghin et al.

(10) Patent No.: US 9,300,514 B2
(45) Date of Patent: Mar. 29, 2016

(54) OFDM GENERATION APPARATUS IN A MULTI-CARRIER DATA TRANSMISSION SYSTEM

(75) Inventors: Nabil Loghin, Stuttgart (DE); Lothar Stadelmeier, Stuttgart (DE); Joerg Robert, Vreden (DE)

(73) Assignee: Sony Corporation, Tokyo (JP)

( * ) Notice: Subject to any disclaimer, the term of this patent is extended or adjusted under 35 U.S.C. 154(b) by 256 days.

(21) Appl. No.: 13/522,152

(22) PCT Filed: Dec. 21, 2010

(86) PCT No.: PCT/EP2010/070428
§ 371 (c)(1),
(2), (4) Date: Jul. 13, 2012

(87) PCT Pub. No.: WO2011/088948
PCT Pub. Date: Jul. 28, 2011

(65) Prior Publication Data
US 2012/0287771 A1    Nov. 15, 2012

(30) Foreign Application Priority Data

Jan. 22, 2010  (EP) .................................... 10151486
Feb. 26, 2010  (EP) .................................... 10154808

(51) Int. Cl.
*H04L 27/28*   (2006.01)
*H04L 27/26*   (2006.01)
(Continued)

(52) U.S. Cl.
CPC .......... *H04L 27/2634* (2013.01); *H04L 27/265* (2013.01); *H04L 27/2628* (2013.01); *H04L 27/367* (2013.01); *H04L 27/3872* (2013.01)

(58) Field of Classification Search
CPC ............ H04L 27/2657; H04L 27/2655; H04L 5/0007

USPC .......... 375/259, 260, 267, 295, 298; 370/203, 370/208, 210
See application file for complete search history.

(56) References Cited

U.S. PATENT DOCUMENTS 8,340,222 B2 *  12/2012  Arambepola et al. ........ 375/316
2009/0325516 A1 *  12/2009  Safavi ........................... 455/126
(Continued)

FOREIGN PATENT DOCUMENTS

CN  1729642 A  2/2006
CN  101179548 A  5/2008

OTHER PUBLICATIONS

ReDesign, "Deliverable D11—Transmission Shortlist Document," URL: http://www.ict-redesign.eu/fileadmin/documents/ReDesign-D11_Coax_transmission-shortlist_document.pdf, Total 62 pages, (Jul. 14, 2009), XP-002628165.

(Continued)

*Primary Examiner* — Daniel Washburn
*Assistant Examiner* — Eboni Hughes
(74) *Attorney, Agent, or Firm* — Oblon, McClelland, Maier & Neustadt, L.L.P.

(57) ABSTRACT

OFDM generation apparatus and methods generating OFDM transmission signals from OFDM symbols, each including a plural OFDM subcarriers, for transmission in a multi-carrier data transmission system. In OFDM systems using the concept of Absolute OFDM and/or using Segmented OFDM common phase rotations of the OFDM subcarriers of the OFDM symbol with respect to adjacent OFDM symbols of the OFDM transmission signal generally appear. To avoid or compensate those common phase rotations, in the apparatus and method a selected mixing frequency is used for mixing the complex time-domain samples of the OFDM symbol from a baseband frequency up to a passband frequency by use of a mixing frequency to obtain the OFDM transmission signal, wherein the mixing frequency is selected such that common phase rotations of the OFDM subcarriers of the OFDM symbol with respect to adjacent OFDM symbols of the OFDM transmission signal are avoided or compensated after the mixing.

28 Claims, 6 Drawing Sheets

(51) Int. Cl.
*H04L 27/38* (2006.01)
*H04L 27/36* (2006.01)

(56) References Cited

U.S. PATENT DOCUMENTS

2011/0182380 A1 7/2011 Muhammad et al.
2012/0287771 A1* 11/2012 Loghin et al. ............. 370/210

OTHER PUBLICATIONS

ETSI EN 302 755 V1.1.1, Digital Video Broadcasting (DVB; Frame structure channel coding and modulation for a second generation digital terrestrial television broadcasting system (DVB-T2), Digital Video Broadcasting, Total 167 pages, (Sep. 2009).

Digital Video Broadcasting (DVB); Frame structructure channel coding and modulation for a second generation digital transmission system for cable systems (DVB-C2), Digital Video Broadcasting, DVB Document A138, Total 109 pages, (Apr. 2009).

International Search Report Issued Mar. 28, 2011 in PCT/EP10/070428 Filed Dec. 21, 2010.

Combined Chinese Office Action and Search Report issued May 29, 2014 in Patent Application No. 2010800621755 (submitting English translation only).

"Digital video broadcasting (DVB); Frame structure channel coding and modulation for a second generation digital transmission system for cable systems (DVB-C2)", Digital Video Broadcasting, Draft ETSI EN 302 769 V1.1.1, Jul. 2009, pp. 16-19, 53-56, 69, 84-87 with cover page.

* cited by examiner

OFDM GENERATION APPARATUS IN A MULTI-CARRIER DATA TRANSMISSION SYSTEM

FIELD OF INVENTION

The present invention relates to an OFDM generation apparatus and method for generating OFDM transmission signals from OFDM symbols, each comprising a plurality of OFDM subcarriers, for transmission in a multi-carrier data transmission system.

The present invention relates further to a transmission apparatus and method, a corresponding receiving apparatus and method, a data transmission system and a computer program for implementing the OFDM generation methods on a computer.

The present invention relates particularly to the field of broadcasting, in particular of Digital Video Broadcasting (DVB), especially to devices, systems and methods in accordance with the DVB-C2 standard or the upcoming DVB-NGH standard.

BACKGROUND OF THE INVENTION

Broadcast systems in accordance with the DVB-C2 standard as described in the DVB-C2 specification (DVB Blue-Book A138 "Digital Video Broadcasting (DVB); Frame structure channel coding and modulation for a second generation digital transmission system for cable systems (DVB-C2)") apply the concept of Absolute OFDM, in which all OFDM subcarriers are seen relative to the absolute frequency 0 MHz instead of a signal center frequency. Reason for the application of Absolute OFDM and unique pilot pattern across the medium spectrum in DVB-C2 is to avoid repeating OFDM subcarrier allocations in the frequency domain that result in an increased PAPR (Peak to Average Power Ratio). The Absolute OFDM signal is described in the final RF frequency domain. This means, however, that a baseband signal cannot be shifted to any RF carrier frequency (also called "mixing frequency" hereinafter) without the introduction of common phase rotations between OFDM symbols after the step of mixing during the OFDM generation by use of the RF carrier frequency.

Further, also without the use of the concept of Absolute OFDM, with the use of segmented OFDM, according to which the payload portion of frames is subdivided into two or more data segments in frequency direction, common phase rotations might be introduced. This is particularly the case if a receiver, e.g. narrow-band (e.g. mobile) receiver, is not tuned to the same mixing frequency as the transmitter, which is normally the case in segmented OFDM reception.

SUMMARY OF INVENTION

It is an object of the present invention to provide an OFDM generation apparatus and method dealing with the problem of common phase rotations of the OFDM subcarriers of successive OFDM symbols, in particular by which such common phase rotations are avoided or compensated.

It is a further object of the present invention to provide a corresponding transmission apparatus and method, a corresponding receiving apparatus and method, a data transmission system and a computer program.

According to an aspect of the present invention there is provided an OFDM generation apparatus for generating OFDM transmission signals from OFDM symbols, each comprising a plurality of OFDM subcarriers, for transmission in a multi-carrier data transmission system, said apparatus comprising an inverse DFT means for inverse discrete Fourier transforming an OFDM symbol into complex time-domain samples, and a frequency mixing means for mixing said complex time-domain samples of said OFDM symbol from a baseband frequency up to a passband frequency by use of a mixing frequency to obtain said OFDM transmission signal, wherein the mixing frequency is selected such that common phase rotations of the OFDM subcarriers of said OFDM symbol with respect to adjacent OFDM symbols of said OFDM transmission signal are avoided or compensated after said mixing.

According to another aspect of the present invention there is provided an OFDM generation apparatus for generating OFDM transmission signals from OFDM symbols, each comprising a plurality of OFDM subcarriers, for transmission in a multi-carrier data transmission system, said apparatus comprising an inverse DFT means for inverse discrete Fourier transforming an OFDM symbol into complex time-domain samples, wherein the OFDM symbols are mapped onto frames of a frame structure having a channel bandwidth, said frames having a payload portion being segmented in frequency domain into data segments each covering a bandwidth portion of said channel bandwidth, and wherein data symbols are mapped onto said data segments, a frequency mixing means for mixing said complex time-domain samples of said OFDM symbol from a baseband frequency up to a passband frequency by use of a transmitter mixing frequency to obtain said OFDM transmission signal, and a receiver mixing frequency determination means for determining receiver mixing frequencies for mixing a received OFDM transmission signal from a passband frequency down to a baseband frequency by use of a receiver mixing frequency to obtain complex time-domain samples of a data symbol in a receiver, wherein the receiver mixing frequencies are selected such that common phase rotations of the OFDM subcarriers of a data symbol with respect to adjacent data symbols of the same data segment are avoided or compensated after mixing a received OFDM transmission signal from a passband frequency down to a baseband frequency by use of said receiver mixing frequency.

According to still another aspect of the present invention there is provided an OFDM generation apparatus for generating OFDM transmission signals from OFDM symbols, each comprising a plurality of OFDM subcarriers, for transmission in a multi-carrier data transmission system, said apparatus comprising a multiplication unit for multiplying the OFDM symbols with a multiplication factor for compensating common phase rotations of the OFDM subcarriers of said OFDM symbol, which could be introduced by mixing said complex time-domain samples of said OFDM symbol from a baseband frequency up to a passband frequency by use of a mixing frequency, an inverse DFT means for inverse discrete Fourier transforming an OFDM symbol into complex time-domain samples, and a frequency mixing means for mixing said complex time-domain samples of said OFDM symbol from a baseband frequency up to a passband frequency by use of said mixing frequency to obtain said OFDM transmission signal.

According to still another aspect of the present invention there is provided an OFDM decoding apparatus for decoding OFDM transmission signals into OFDM symbols, each comprising a plurality of OFDM subcarriers, received in a multicarrier data transmission system, said apparatus comprising a frequency mixing means for mixing said OFDM transmission signal from a passband frequency down to a baseband frequency by use of a mixing frequency to obtain complex time-domain samples of an OFDM symbol, and a DFT means for discrete Fourier transforming said complex time-domain samples into a data symbol, wherein the mixing frequency is selected such that common phase rotations of the OFDM subcarriers of said OFDM symbol are avoided or compensated.

According to still another aspect of the present invention there is provided an OFDM decoding apparatus for decoding OFDM transmission signals into data symbols, each comprising a plurality of OFDM subcarriers, received in a multicarrier data transmission system, said apparatus comprising a frequency mixing means for mixing said OFDM transmission signal from a passband frequency down to a baseband frequency by use of a mixing frequency to obtain complex time-domain samples of a data symbol, wherein the OFDM symbols are mapped onto frames of a frame structure having a channel bandwidth, said frames having a payload portion being segmented into data segments each covering a bandwidth portion of said channel bandwidth, and wherein said OFDM symbols are subdivided into data symbols mapped onto said data segments, and a DFT means for discrete Fourier transforming said complex time-domain samples into a data symbol, wherein the mixing frequency is selected such that common phase rotations of the OFDM subcarriers of said data symbol are avoided or compensated.

According to further aspects of the present invention there are provided corresponding OFDM generation methods and OFDM decoding methods, a transmission apparatus and method, a receiving apparatus and method, a data transmission system as well as a computer program comprising program means for causing a computer to carry out the steps of said OFDM generation methods or said OFDM decoding methods as defined above, when said computer program is carried out on a computer.

Preferred embodiments of the invention are defined in the dependent claims. It shall be understood that the claimed devices, methods, system and computer program have similar and/or identical preferred embodiments as defined in the dependent claims defining preferred embodiment of the OFDM generation apparatus.

The present invention is based on the common inventive idea that undesired common phase rotations of the OFDM subcarriers of an OFDM symbol or a data symbol (in case of using a segmented OFDM as, for instance, according to the DVB-C2 standard or according to the upcoming DVB-NGH standard) are avoided or compensated by taking appropriate measures related to the carrier frequency by which the complex time-domain samples are mixed. This is of particular importance for systems (e.g. according to the DVB-C2 standard) that apply Absolute OFDM, since the generated OFDM signal is described in the passband and does not contain any phase rotations between adjacent OFDM symbol. It should be understood that generating an OFDM signal in the passband is very complex and costly. Therefore it is beneficial to generate the signal in the equivalent baseband and to mix it with a suitable mixing frequency into the passband. However, normally this mixing process results in the described phase rotations between OFDM symbols. However, also in other systems not using the concept of Absolute OFDM, but using segmented frames (i.e. using the concept of segmented OFDM) the problem of phase rotations can generally appear.

To overcome this problem, according to the present invention the carrier frequency is selected such that such common phase rotations are completely avoided or compensated. According to another solution, based on the same idea, the OFDM symbols are multiplied with a multiplication factor, which artificially introduces common phase rotations between OFDM symbols in the baseband signal, which, however, balance the phase rotations caused by the mixing of the complex time-domain samples of the OFDM symbol from a baseband frequency up to a passband frequency by use of a mixing frequency, so that finally no common phase rotations appear in the passband signal (i.e. the Absolute OFDM signal contains no phase rotations between OFDM symbols). Hence, according to the present invention it can be achieved, that signals can be generated that are in conformity with the related standards, if there is any standard to be observed. Further, embodiments of the present invention provide solutions for avoiding unwanted common phase rotations (in systems using segmented OFDM, but not necessarily using Absolute OFDM), if the receiver tunes to the center frequency of a data segment, which is not necessarily the center frequency of the overall signal.

It shall be noted that herein the terms "carrier" and "subcarrier" are used interchangeably and shall carry the same meaning.

BRIEF DESCRIPTION OF DRAWINGS

These and other aspects of the present invention will be apparent from and explained in more detail below with reference to the embodiments described hereinafter. In the following drawings

DESCRIPTION OF PREFERRED EMBODIMENTS

Figure 1:
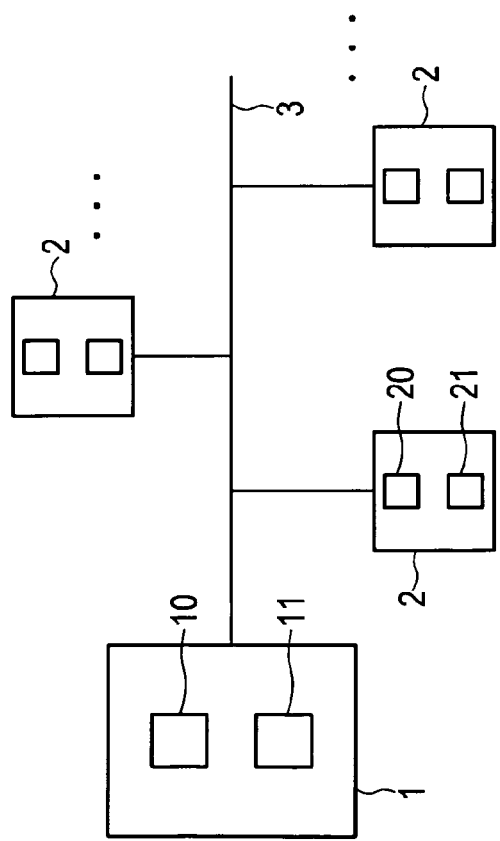
FIG. 1 shows a block diagram of a data transmission system according to the present invention.

The DVB-C2 specification introduces the new concept of Absolute OFDM, in which all OFDM subcarriers are seen relative to the absolute frequency 0 MHz instead of a signal centre frequency. In particular, the L1 part 2 signalling blocks begin at the absolute frequency of 0 MHz and are partitioned in steps of 7.61 MHz. In contrast to other DVB standards it is not possible to shift a C2 baseband signal to any RF mixing frequency rather than being defined in a unique way for the whole cable spectrum. Especially the pilot sequences of the OFDM signal are different for all different frequencies. The reason for that behavior is to avoid unwanted repetitions in the frequency domain which may cause unwanted high peak values of the OFDM signal in time domain. Furthermore the unambiguous pilot sequences allow for easy and reliable synchronization and offset compensation. Although the L1 part 2 block partitioning and the related pilot sequences are defined for the whole cable spectrum, L1 blocks are only transmitted in those frequencies where data slices are present.

The formulas given in section 10.1 of DVB-C2 specification defining the passband signal emitted from the OFDM generator are of the precise theoretical mathematical description, but are impractical for real implementations. Real implementations for OFDM signal generation are normally based on the inverse Fast Fourier Transform and the equivalent lowpass representation of signals. However, the generation of a standard compliant DVB-C2 signal using the equivalent lowpass representation requires additional considerations. Otherwise, unwanted phase jumps may be generated between adjacent OFDM symbols that could disturb the synchronisation procedure within the receiver, Practical implementations based on the inverse Fast Fourier Transform and the equivalent lowpass representation are therefore proposed according to the present invention.

Due to the application of Absolute OFDM the direct signal generation within the passband is complex or even impractical. Therefore, OFDM generation using the equivalent lowpass representation is proposed. The signal is generated at low frequencies and shifted to the final frequency afterwards.

According to the DVB-C2 specification the emitted passband signal is described by the following expression:

$$s(t) = Re\left\{\sum_{m=0}^{\infty}\left[\frac{1}{\sqrt{K_{total}}}\sum_{l=0}^{L_F-1}\sum_{k=K_{min}}^{K_{max}} c_{m,l,k} \times \psi_{m,l,k}(t)\right]\right\} \text{ where}$$

$$\psi_{m,l,k}(t) = \begin{cases} e^{j2\pi\frac{k}{T_U}(t-\Delta-lT_s-mT_F)} & mT_F + lT_S \le t < mT_F + (l+1)T_S \\ 0 & \text{otherwise} \end{cases}$$

and
k denotes the carrier number;
l denotes the OFDM Symbol number starting from 0 for the first Preamble Symbol of the frame;
m denotes the C2 Frame number;
$K_{total}$ is the number of transmitted carriers, i.e. $K_{total}=K_{max}-K_{min}+1$;
$L_F$ total number of OFDM Symbols per frame (including the preamble);
$T_S$ is the total symbol duration for all symbols, and $T_S=T_U+\Delta$;
$T_U$ is the active symbol duration;
$\Delta$ is the duration of the guard interval;
$C_{m,l,k}$ is the complex modulation value for carrier k of the OFDM Symbol number l in C2 Frame number m;
$T_F$ is the duration of a frame, $T_F=L_F T_S$;
$K_{min}$ Carrier index of first (lowest frequency) active carrier; and
$K_{max}$ Carrier index of last (highest frequency) active carrier.

In order to generate this signal within using the equivalent lowpass representation, a carrier to shift the frequencies is added, which is compensated within the equation of:

$$s(t) = \frac{1}{\sqrt{K_{total}}} \cdot Re\left\{e^{j2\pi f_c t} \cdot \sum_{m=0}^{\infty}\sum_{l=0}^{L_F-1}\sum_{k=K_{min}}^{K_{max}} c_{m,l,k} \cdot \Psi'_{m,l,k}(t)\right\} \quad (1)$$

with $$\psi'_{m,l,k}(t) = \quad (2)$$

$$\begin{cases} e^{j2\pi\frac{k}{T_U}(t-\Delta-lT_s-mT_F)} \cdot e^{-j2\pi f_c t} & mT_F + lT_S \le t < mT_F + (l+1)T_S \\ 0 & \text{otherwise} \end{cases}$$

Equation (2) cannot be directly transformed into the equation known from section 9.5 of the DVB-T2 specification (ETSI EN 302 755 V1.1.1 (2009-09) "Digital Video Broadcasting (DVB): Frame structure channel coding and modulation for a second generation digital terrestrial television broadcasting system (DVB-T2)") defining the signal emitted by the OFDM generator as used in a transmitter according to the DVB-T2 standard. The reason is the second exponential term. While the equations defined in section 9.5 of the DVB-T2 specification are independent from the actual mixing frequency $f_c$, this initially will lead to phase jumps between OFDM symbols of the DVB-C2 signal. However, this effect can be avoided by means of a well-chosen mixing frequency $f_c$. Therefore, the mixing frequency shall be defined as:

$$f_c = \frac{k_c}{T_U}$$

where $1/T_U$ is the OFDM subcarrier spacing, and $k_c$ is the OFDM subcarrier index at the mixing frequency. Furthermore, k shall be substituted by $k=k'+k_c$. This leads to:

$$\psi'_{m,l,k}(t) = \quad (3)$$

$$\begin{cases} e^{j2\pi\frac{k'+k_c}{T_U}(t-\Delta-lT_s-mT_F)} \cdot e^{-j2\pi\frac{k_c}{T_U}t} & mT_F + lT_S \le t < mT_F + (l+1)T_S \\ 0 & \text{otherwise} \end{cases}$$

which can be reformulated as:

$$\psi'_{m,l,k}(t) = \begin{cases} e^{j2\pi\frac{k'}{T_U}(t-\Delta-lT_s-mT_F)} \cdot e^{-j2\pi\frac{k_c}{T_U}\Delta(1+l+mL_F)} & mT_F + lT_S \le t < mT_F + (l+1)T_S \\ 0 & \text{otherwise} \end{cases} \quad (4)$$

Equation (4) looks similar to the signal definition of the DVB-T2 signal as described in section 9.5 of the DVB-T2 specification. However, both equations differ in the last exponential term. This term is independent of the time t and causes a constant phase rotation for all OFDM subcarriers of a given OFDM symbol. Generally, it is possible to choose $k_c$ freely (and thus $f_c$) and to compensate this phase rotation. However, this term can be avoided by choosing $k_c$ properly. For this purpose, equation (4) can be written as:

$$\psi'_{m,l,k}(t) = \begin{cases} e^{j2\pi \frac{k'}{T_U}(t-\Delta-lT_S-mT_F)} \cdot e^{-j2\pi \frac{k_c}{T_U} \cdot T_U\left(\frac{\Delta}{T_U}\right)(1+l+mL_F)} & mT_F + lT_S \leq t < mT_F + (l+1)T_S \\ 0 & \text{otherwise} \end{cases} \quad (5)$$

(5), where $(/T_U)$ is the relative Guard Interval duration (e.g. 1/64 or 1/128 for DVB-C2). Additional simplification of (5) leads to:

$$\psi'_{m,l,k}(t) = \begin{cases} e^{j2\pi \frac{k'}{T_U}(t-\Delta-lT_S-mT_F)} \cdot e^{j\varphi_{k_c}(1+l+mL_F)} & mT_F + lT_S \leq t < mT_F + (l+1)T_S \\ 0 & \text{otherwise} \end{cases} \quad (6)$$

Hence, this leads to a common phase rotation of $$\varphi_{k_c} = -2\pi \cdot k_c \left(\frac{\Delta}{T_U}\right) \quad (7)$$

for all OFDM subcarriers between two consecutive OFDM symbols, which depends on the choice of the relative Guard Interval duration ($\Delta/T_U$) (e.g. 1/64 or 1/128 for DVB-C2) and the OFDM subcarrier $k_c$ at the mixing frequency.

If $k_c (\Delta/T_U)$ is integer, the phase shift can be removed from the equation as it becomes multiples of $2\pi$. Hence, if $k_c$ is multiple of 128 for Guard Interval 1/128, or multiple of 64 for Guard Interval 1/64, equation (6) can be written as:

$$\psi'_{m,l,k}(t) = \begin{cases} e^{j2\pi \frac{k'}{T_U}(t-\Delta-lT_S-mT_F)} & mT_F + lT_S \leq t < mT_F + (l+1)T_S \\ 0 & \text{otherwise} \end{cases} \quad (8)$$

which is similar to the equation for the generation of a DVB-T2 signal. However, it has to be noted that the mixing frequency $f_c$ is consequently not the centre frequency of the signal in most cases.

As described above, a common phase rotation may be artificially introduced to the system, depending on the mixing frequency. This common phase rotation is compensated according to an embodiment of the present invention in order to obtain an output signal as defined in the DVB-C2 specification. Alternatively, according to another embodiment this common phase rotation can be avoided by carefully choosing the mixing frequency $f_c$. Therefore, the OFDM subcarrier $k_c$ at the mixing frequency $f_c$ shall be chosen as:

$$k_c = \left\lfloor \frac{K_{max} + K_{min}}{2} \cdot \frac{\Delta}{T_U} + \frac{1}{2} \right\rfloor \cdot \frac{1}{\left(\frac{\Delta}{T_U}\right)}, \quad (9)$$

where $(/T_U)$ is the relative Guard Interval duration (i.e. 1/64 or 1/128 in DVB-C2). Practically, equation (9) obtains the carrier $k_c$ that is closest to the central OFDM subcarrier $(K_{max}+k_{min})/2$, and additionally, generates multiples of $2\pi$ in the above equation (7). Here, the operation $\lfloor x \rfloor$ denotes the floor operation (largest integer not greater than x). More generally, the mixing frequency $f_c$ is selected as $$f_c = \frac{k_c}{T_U}$$

with the OFDM subcarrier $k_c$ at the mixing frequency $f_c$ being selected to be close or as close as possible to the central subcarrier among the subcarriers of said OFDM symbol. Here, "close" shall be understood such that not necessarily the mixing frequency $f_c$ must be located as close as possible to the central subcarrier, but can also be located farther away. For instance, one of the next possible mixing frequencies (seen from the frequency of the central subcarrier) that fulfills the above mentioned condition that $k_c(\Delta/T_U)$ is integer can be selected as well.

Consequently, the obtained mixing frequency $f_c$ is:

$$f_c = \frac{k_c}{T_U}, \quad (10)$$

where $1/T_U$ is the OFDM subcarrier spacing. Here, the resulting mixing frequency $f_c$ is not the centre frequency of the OFDM signal in most cases.

In a more general embodiment the mixing frequency $f_c$ is selected as $$f_c = \frac{k_c}{T_U}$$

with the OFDM subcarrier $k_c$ at the mixing frequency $f_c$ being selected to be as close as possible to the central subcarrier among the subcarriers of said OFDM symbol, wherein $T_U$ is the useful OFDM symbol duration. In other words, the mixing frequency $f_c$ is selected such that the OFDM subcarrier $k_c$ at the mixing frequency $f_c$ is selected that is nearest to $$k_c = \frac{K_{max} + K_{min}}{2}.$$

In the following it is assumed that the mixing frequency $f_c$ is chosen as described above in equations (9) and (10). Hence, the transmitted signal can be described as:

$$s(t) = \frac{1}{\sqrt{K_{total}}} \cdot Re\left\{ e^{j2\pi f_c t} \cdot \sum_{m=0}^{\infty} \sum_{l=0}^{L_F-1} \sum_{k=K_{min}}^{K_{max}} (c_{m,l,k} \cdot e^{j\varphi_{m,l}}) \cdot \Psi''_{m,l,k}(t) \right\} \quad (11)$$

with $$\Psi''_{m,l,k}(t) = \qquad (12)$$

$$\begin{cases} e^{j2\pi \frac{k'}{T_U}(t-\Delta-lT_S-mT_F)} & mT_F+lT_S \leq t < mT_F+(l+1)T_S \\ 0 & \text{otherwise} \end{cases},$$

and $$\varphi_{m,l} = -\varphi_{k_c} \cdot (1+l+m \cdot L_F) \qquad (12a)$$

where
$k_c$ denotes the OFDM subcarrier at the mixing frequency $f_c$;
k' denotes the carrier number relative to the OFDM subcarrier at the mixing frequency $f_c$, i.e. $k'=k-k_c$;
$\phi_{k_c}$ denotes the phase jump between two consecutive OFDM symbols as calculated according to equation (7); and
where the other parameters have the above mentioned meaning.

Practically, this generation is equivalent to the generation of a DVB-T2 signal as shown above. The only difference is the additional phase correction term $\phi_{m,l}$ that linearly increases every OFDM symbol and compensates the unwanted phase rotations in the generated output signal. The data $c'_k$ that is used for calculating the inverse FFT is the inner bracket of equation (11), i.e. $(c_{m,l,k} \cdot e^{j\Phi_{m,l}})$.

An embodiment of a possible implementation of a transmitter will now be described. First, in FIG. 1 a multi-carrier data transmission system, here a broadcast system, according to the present invention is shown, in particular according to the DVB-C2 standard. The multi-carrier broadcast system comprises a transmitter 1 for transmitting data and one or more receivers 2 for receiving data from said transmitter 1.

The transmitter 1 is provided for processing input data, e.g. one or more MPEG-2 Transport Streams and/or one or more Generic Streams, to obtain OFDM transmission signals, which are fed into a cable network 3, to which said receivers 2 are connected. For this purpose the transmitter comprises particularly an OFDM generator 10 for generating said OFDM transmission signals from OFDM symbols obtained as input data or generated from the input data of the transmitter 1 (for which purpose the transmitter 1 may additionally comprise further elements, e.g. as described in the DVB-C2 standard). Further, the transmitter 1 comprises a transmitter unit 11 for feeding the obtained OFDM transmission signals into the cable network 3.

The receivers 2 each comprise a receiver unit 20 for receiving said OFDM transmission signals from the cable network 3 and an OFDM decoder 21 for decoding OFDM transmission signals into OFDM symbols, which are then outputted for further processing or which are directly further processed in the receiver 2 (for which purpose the receiver 2 may additionally comprise further elements, e.g. as described in the DVB-C2 standard).

Figure 2:
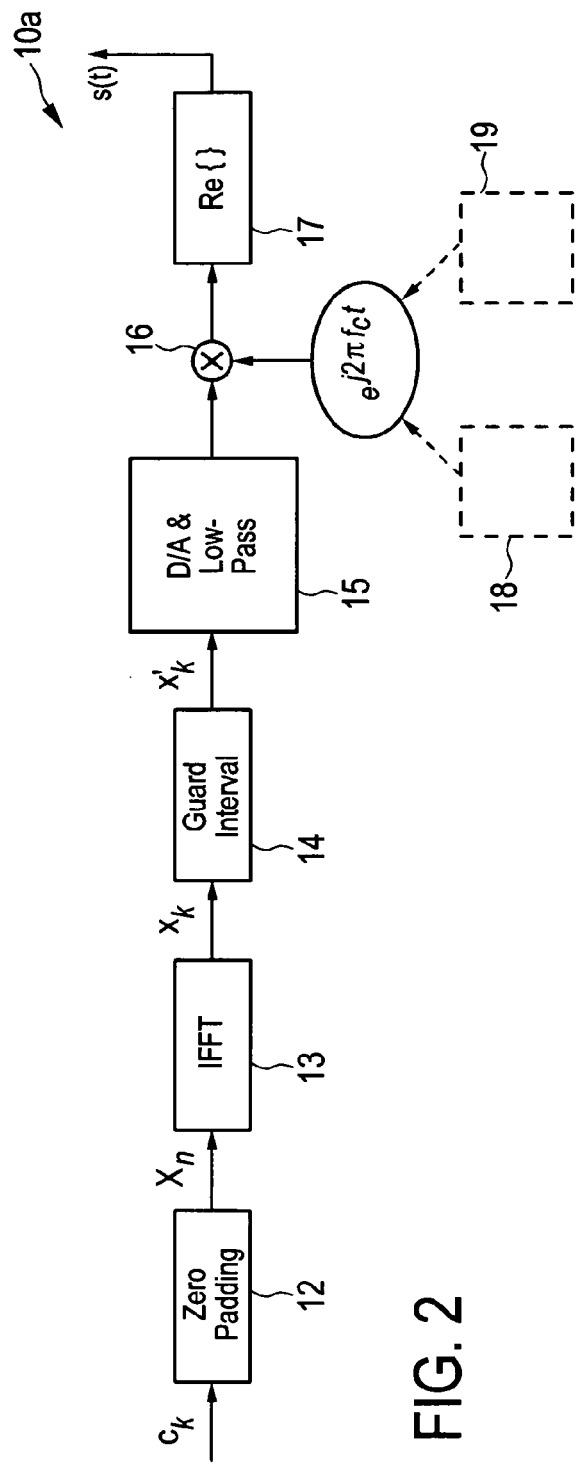
FIG. 2 shows a block diagram of a first embodiment of an OFDM generator according to the present invention.

FIG. 2 depicts a schematic block diagram of an embodiment of an OFDM generator 10a for the generation of the OFDM signal s(t), which will be described in detail in the following. Briefly summarized, the input signal to the OFDM generator is first zero padded for preparation of the inverse Fast Fourier Transform (IFFT). Then, the Guard Interval is added, the signal is converted from digital to analog, and finally, shifted to the wanted passband frequency.

The zero padding in a zero padding unit 12 is preferably provided to pre-condition the signal for the transformation of the frequency domain signal into the time domain using the Inverse Fast Fourier Transform. Firstly, the signal is stuffed in order to fit the IFFT size N. Secondly, a realignment of the subcarrier positions is done to be able to use the IFFT.

In order to use the Inverse Fast Fourier Transform, e.g. based on the Radix 2 algorithm, it has to hold $N=2^p$, $p=1, 2, 3, 4, \ldots$. Generally, instead of using a Fast Fourier Transform it is also possible to use a Discrete Fourier Transform (DFT). Furthermore, the value N shall be significantly higher than the actual number of used OFDM subcarriers in order to avoid alias effects, i.e.

$$K_{total}=K_{max}-K_{min}+1 \leq N=K_{total}+x, \qquad (13),$$

where x shall preferably be at least 512 for practical implementations according to DVB-C2, but could also be lower, e.g. 64 for WLAN applications.

Figure 3:
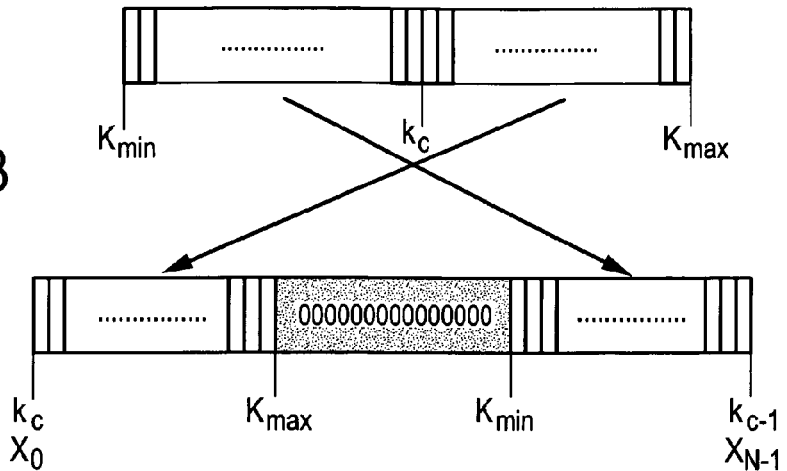
FIG. 3 shows a diagram illustrating zero padding.

FIG. 3 depicts the principle of the zero padding. In principle, it realises a cyclic shift operation on the actually used OFDM subcarriers and inserts zeros to the remaining positions. Mathematically this operation can be described as:

$$X(n)_{m,l} = \begin{cases} c_{m,l,k_c+n} & 0 \leq n \leq K_{max}-k_c \\ 0 & \text{otherwise} \\ c_{m,l,k_c+(n-N)} & N-(k_c-K_{min}) \leq n < N \end{cases} \qquad (14)$$

for $0 \leq n < N$, where $X(n)_{m,l}$ (or $X_n$ in short) is the N element input signal of the subsequent IFFT unit 13.

The output signal $X_n$ of the zero padding unit 12 has been generated within the frequency domain. The task of the IFFT unit 13 is the calculation of the corresponding time signal. This is achieved by means of $$x(n')_{m,l} = \frac{1}{\sqrt{K_{total}}} \sum_{n=0}^{N-1} X(n)_{m,l} \cdot e^{j2\pi \frac{n' \cdot n}{N}} \qquad (15)$$

for $0 \leq n' < N$, where m is the OFDM symbol, l the C2 frame number, and $K_{total}$ the total number of active OFDM subcarriers.

Figure 4:
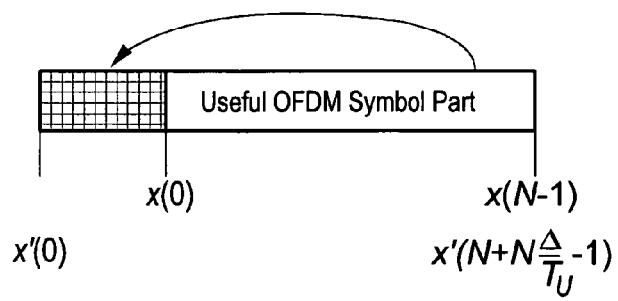
FIG. 4 shows a diagram illustrating the generation of guard intervals.

The time domain signal $x_k$ (which is the short hand notation for $x(n')_{m,l}$ in (15) if n' is substituted by k) outputted from the IFFT unit 13 is provided to a guard interval insertion unit 14. FIG. 4 depicts the insertion of the guard interval between the OFDM symbols. The guard interval is a cyclic copy of the last part of the useful OFDM symbol part, which is copied to the beginning. Mathematically, the OFDM symbol including the guard interval x'(n) (called $x'_k$ in FIG. 4) is obtained as $$x'(n)_{m,l} = \begin{cases} x\left(n+N-N \cdot \frac{\Delta}{T_U}\right) & 0 \leq n < N \cdot \frac{\Delta}{T_U} \\ x\left(n-N \cdot \frac{\Delta}{T_U}\right) & N \cdot \frac{\Delta}{T_U} \leq n < N+N \cdot \frac{\Delta}{T_U} \end{cases} \qquad (16)$$

Figure 5:
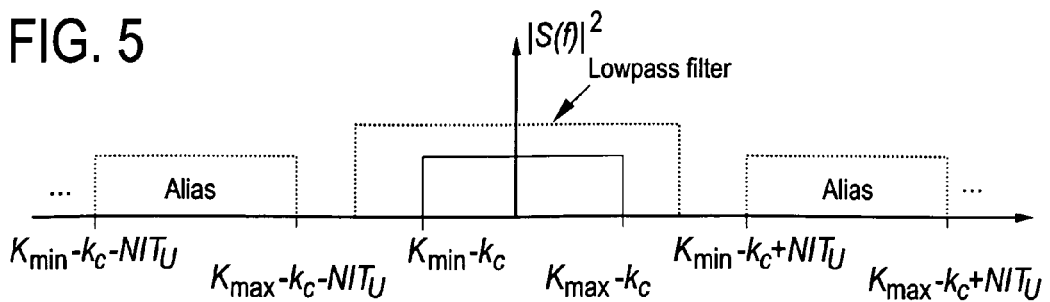
FIG. 5 shows a diagram illustrating the digital signal and its aliases.

The previous calculations have been made in the digital domain. The task of the D/A & low-pass filtering unit 15 is the conversion into an analogue signal. Therefore, the signal $x'(n)_{m,l}$ sampled with the sampling rate $N/T_U$ has to be analogized OFDM symbol by OFDM symbol. This causes alias at multiples of the sampling rate as depicted in FIG. 5 that is removed by means of the low-pass filter included in unit 15. This filtering is simpler for higher distances between the wanted and the alias signals, which is the reason why small values of x for the zero padding (see equation (13)) are impractical.

Finally, the equivalent lowpass signal outputted from unit 15 is shifted into the wanted passband by a mixer 16. The mixer 16 mixes the signal output of unit 15 with the mixing frequency $f_c$, which is equivalent to a complex multiplication of the signal by $e^{j2\pi f_c t}$. The mixing frequency $f_c$ is for this purpose calculated as described above to avoid or at least compensate any common phase rotations of the OFDM subcarriers of the OFDM symbol. From the result, the real part is determined in real part selection unit 17, which is then finally outputted from the OFDM generator 10a for transmission.

The correct mixing frequency may optionally be predetermined and stored in a storage means 18, e.g. a memory unit. In addition or as an alternative, a frequency calculation means 19 may be provided for calculating the mixing frequency.

Figure 6:
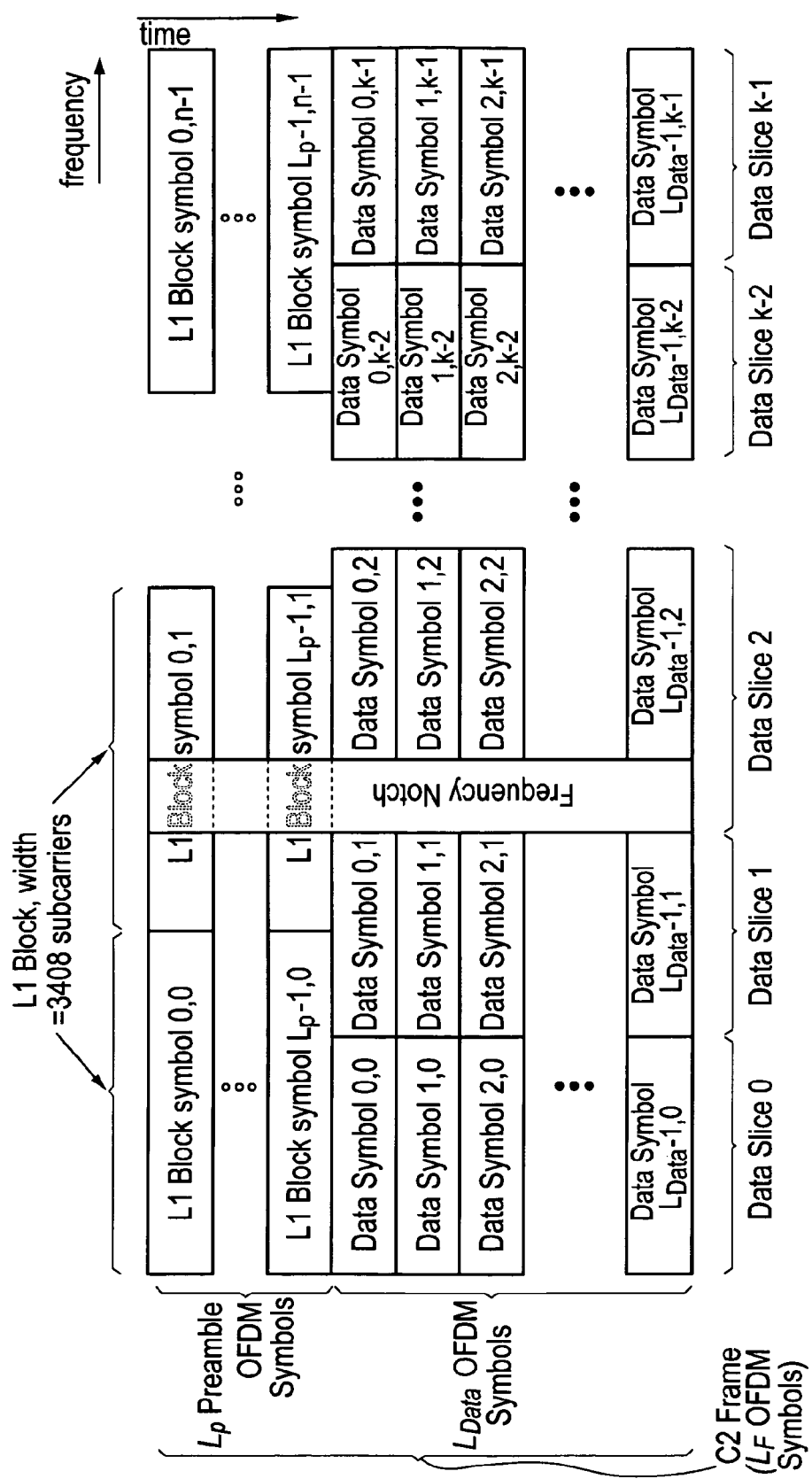
FIG. 6 illustrates the segmented frame structure as used according to DVB-C2.

The same principle explained above can also be applied in systems using a segmented frame structure, as is the case in the DVB-C2 system. Said frame structure (called "C2 frame structure") is depicted in FIG. 6. The C2 frame structure comprises $L_P$ Preamble Symbols ($L_P \geq 1$) followed by $L_{data}$ data symbols (the portion of the C2 frame comprising the $L_{data}$ data symbols also being called "payload portion"). The preamble symbols are divided in frequency direction into L1 block symbols of same bandwidth (3408 subcarriers or approx. 7.61 MHz). The data slices (also called "data segments") have an arbitrary bandwidth as a multiple of the pilot pattern specific granularity but shall not exceed the L1 block symbol bandwidth. Frequency notches can be inserted into the C2 signal across a C2 frame.

Data slices can be treated as separate channels and no interleaving is performed between different ones. Each data slice is identified by a start OFDM carrier $K_{DS,min}$ and an end OFDM carrier $K_{DS,max}$. Hence, $K_{DS,min}$ is the carrier index of first active carrier of the data segment, onto which the data symbol mixed with said mixing frequency is mapped, having the lowest frequency and $K_{DS,max}$ is the carrier index of the last active carrier of the data segment, onto which the data symbol mixed with said mixing frequency is mapped, having the highest frequency.

On the transmitter side the IFFT and the mixing on the OFDM symbols is done as usual by use of a transmitter mixing frequency, which can be selected freely or in accordance with the above described embodiment. In addition, however, receiver mixing frequencies are determined and signaled to the receiver from the transmitter (in addition to the transmitter mixing frequency) for use by the receiver, in particular an OFDM decoding apparatus. These receiver mixing frequencies are determined for each data segment or group of data segments. In other words, if the channel having a certain channel bandwidth is subdivided into multiple data segments covering a bandwidth portion of said channel bandwidth, these data segments are dealt with independently by the OFDM decoder in the receiver, and for each data segment (or group of data segments) an individual receiver mixing frequency is determined.

Figure 7:
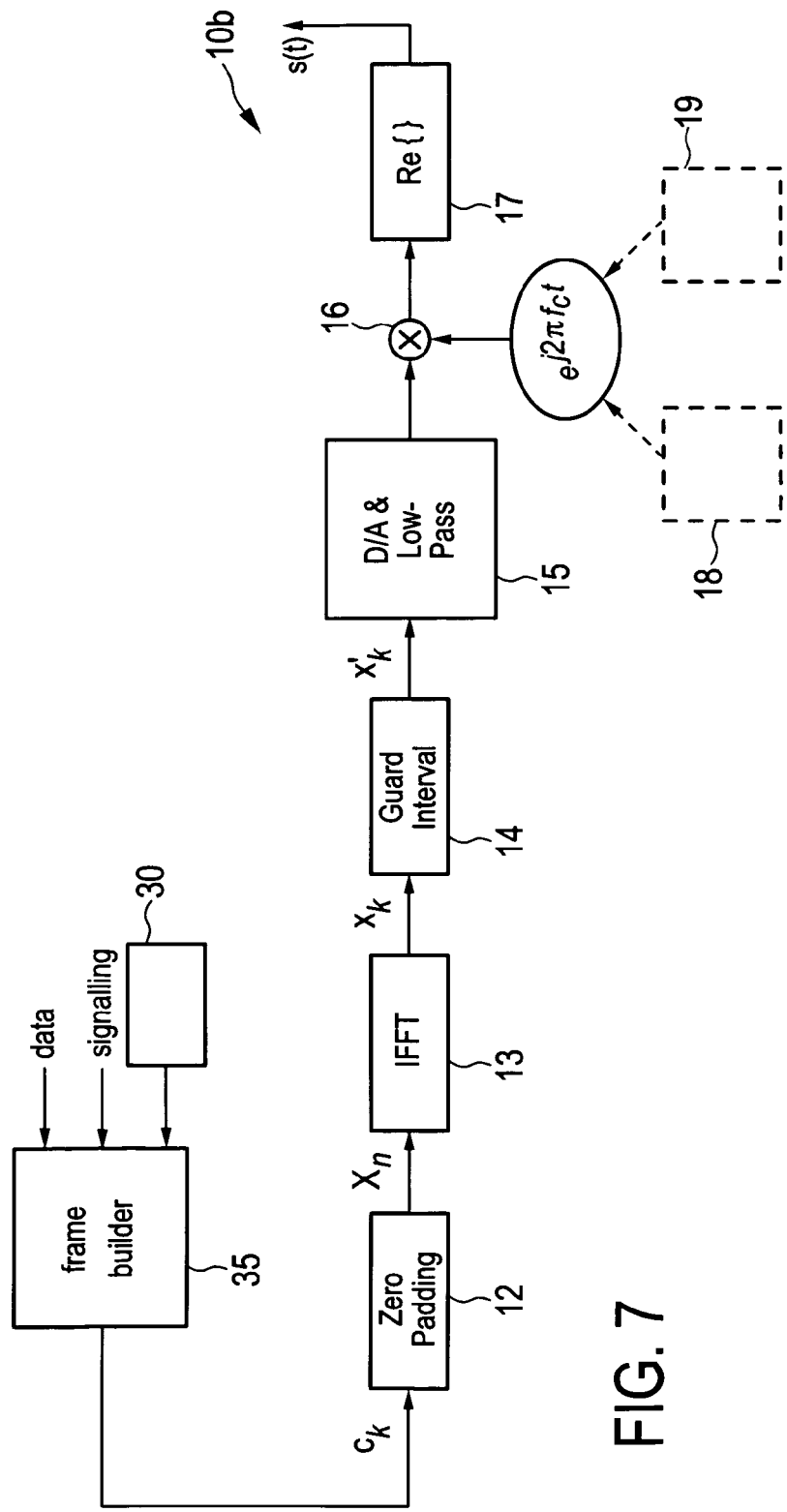
FIG. 7 shows a block diagram of a second embodiment of an OFDM generator according to the present invention.

Thus, in an embodiment 10b as depicted in FIG. 7 a receiver mixing frequency determination means 30 is provided for determining receiver mixing frequencies for mixing a received OFDM transmission signal from a passband frequency down to a baseband frequency by use of a receiver mixing frequency $f_{DS,c}$ to obtain complex time-domain samples of a data symbol in the receiver. Therein, the receiver mixing frequencies $f_{DS,c}$ are selected such that common phase rotations of the OFDM subcarriers of a data symbol with respect to adjacent data symbols of the same data segment are avoided or compensated after mixing a received OFDM transmission signal from a passband frequency down to a baseband frequency by use of said receiver mixing frequency $f_{DS,c}$.

Said receiver mixing frequencies $f_{DS,c}$ are thus determined for the individual data segments (or, alternatively, if a data symbols extends over multiple data segments for said group of multiple data segments) since the receiver, in particular the OFDM decoder of the receiver also handles the data segments (or groups of data segments) individually in systems using such a segmented frame structure.

In particular, in an embodiment the receiver mixing frequency $f_{DS,c}$ of a data segment (data slice) DS is selected as $$f_{DS,c} = \frac{k_{DS,c}}{T_U}$$

with the OFDM subcarrier $k_{DS,c}$ at the mixing frequency $f_{DS,c}$ fulfilling the condition that $$k_{DS,c} \cdot \left(\frac{\Delta}{T_U}\right)$$

is an integer, wherein $T_U$ is the useful OFDM symbol duration and is the duration of the guard interval. Further, in another embodiment, the mixing frequency $f_{DS,c}$ of a data segment (data slice) DS is selected as $$f_{DS,c} = \frac{k_{DS,c}}{T_U}$$

with the OFDM subcarrier $k_{DS,c}$ at the mixing frequency $f_{DS,c}$ being selected as $$k_{DS,c} = \left\lfloor \frac{K_{DS,max} + K_{DS,min}}{2} \cdot \frac{\Delta}{T_U} + \frac{1}{2} \right\rfloor \cdot \frac{1}{\left(\frac{\Delta}{T_U}\right)}.$$

More generally, a receiver mixing frequency $f_{DS,c}$ is selected as $$f_{DS,c} = \frac{k_{DS,c}}{T_U}$$

with the OFDM subcarrier $k_{DS,c}$ at the receiver mixing frequency $f_{DS,c}$ being selected to be close or as close as possible to the central subcarrier among the subcarriers of said data symbol.

As shown in FIG. 7, the receiver mixing frequencies $f_{DS,c}$ are provided to a (generally known) frame builder 35, which is not part of the OFDM generator. 0Said frame builder 35 builds the frames according to the predetermined framing structure from received data, signaling information and said receiver mixing frequencies $f_{DS,c}$, which are thus signaled to the receiver for use there in the OFDM decoding as will be explained below.

Figure 8:
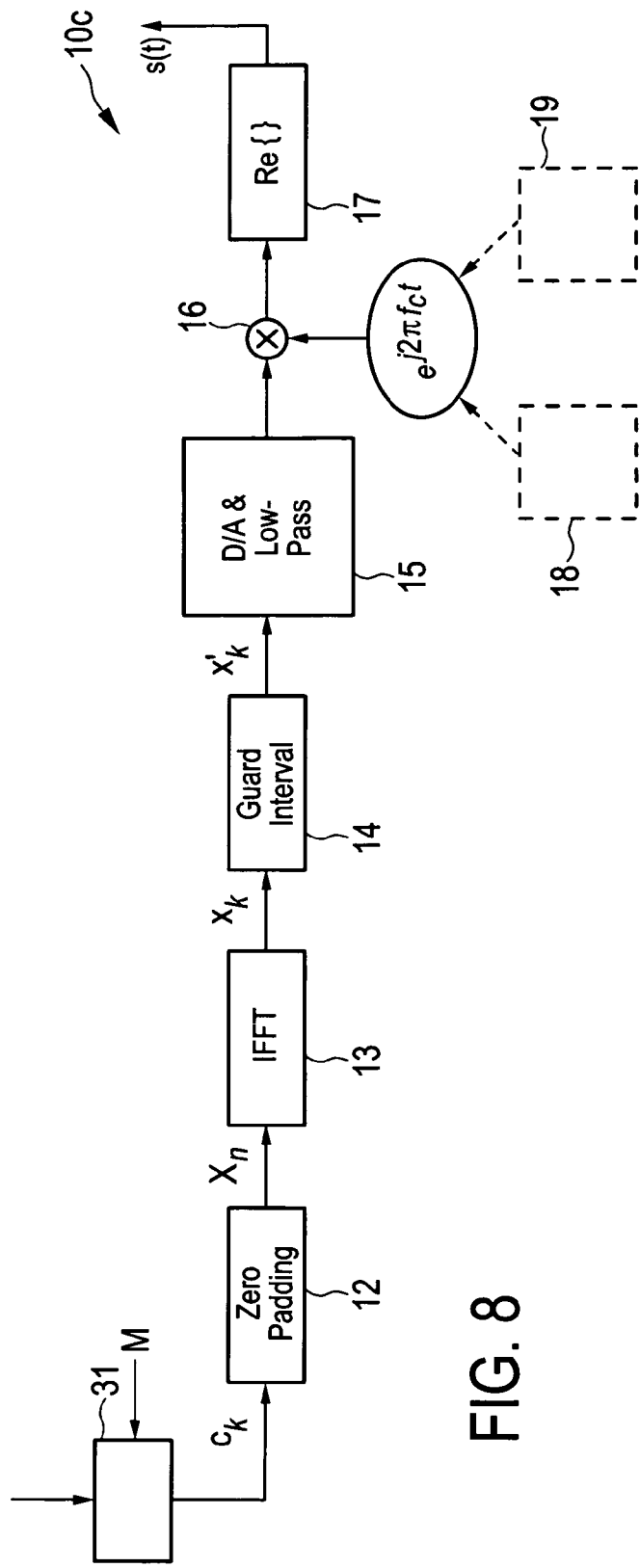
FIG. 8 shows a block diagram of a third embodiment of an OFDM generator according to the present invention.

Another embodiment 10c of an OFDM generator is depicted in FIG. 8. In addition to the general units 12 to 17 provided in the embodiment depicted in FIG. 2, a multiplication unit 31 is provided in this embodiment for multiplying the baseband OFDM symbols with a multiplication factor M for compensating common phase rotations of the OFDM subcarriers of said OFDM symbol, which could be introduced by mixing said complex time-domain samples of said OFDM symbol from a baseband frequency up to a passband frequency by use of the mixing frequency. Hence, said multiplication factor M anticipates possible common phase rotations and represents a measure for counteracting against them in the transmitter. The described operation shall be seen as a phase predistortion of the baseband signal to allow a passband signal without phase rotations between successive OFDM symbols.

Thus, it can be calculated in advance that a common phase rotation of $$\varphi_{k_c} = -2\pi \cdot k_c \left( \frac{\Delta}{T_U} \right)$$

is generated, which can be compensated by, on purpose, introducing an "opposite" common phase rotation by said multiplication factor, which can then be selected in an embodiment as $M = e^{j\phi_{m,l}}$ wherein $\phi_{m,l}$ is defined as above in equation (12a).

Figure 9:
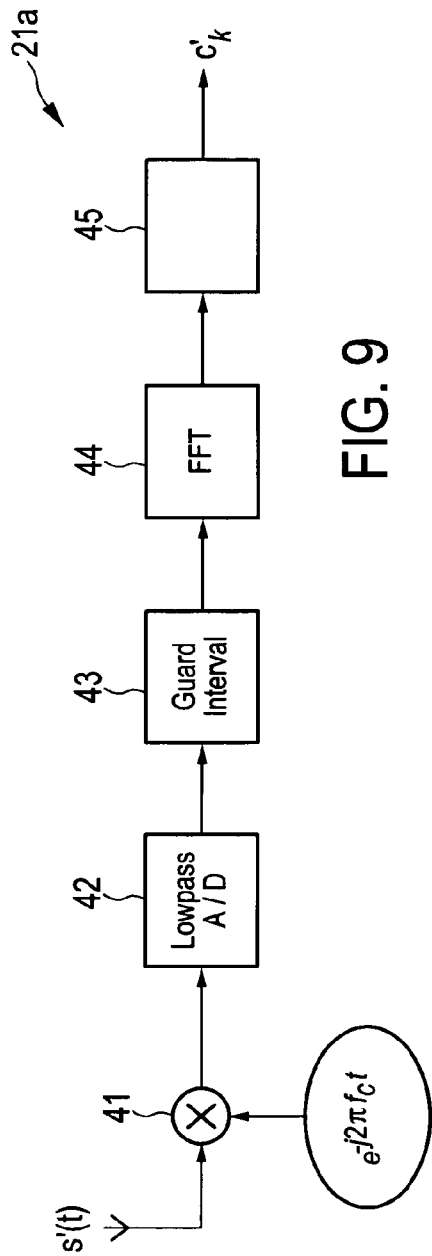
FIG. 9 shows a block diagram of a first embodiment of an OFDM decoder according to the present invention.

A block diagram of an embodiment of an OFDM decoder 21a is depicted in FIG. 9. It receives a received OFDM signal s'(t) which is subsequently provided to similar units as provided in the OFDM generator 10, in particular a mixer 41, a low-pass filter and analogue-to-digital converter 42, a guard interval remover 43, an FFT unit 44 and a zero remover 45. The general layout of these units as generally provided in an OFDM decoder is known so that details thereof are not described here.

The mixer 41 is adapted for mixing the received OFDM transmission signal (s'(t)) from a passband frequency down to a baseband frequency by use of a mixing frequency $f_c$ to obtain complex time-domain samples of an OFDM symbol. The mixing frequency $f_c$, which has also been used by the OFDM generator and which has preferably been signaled from the transmitter to the receiver, is selected such that common phase rotations of the OFDM subcarriers of said OFDM symbol with respect to adjacent OFDM symbols of said OFDM transmission signal s'(t) are avoided or compensated.

Figure 10:
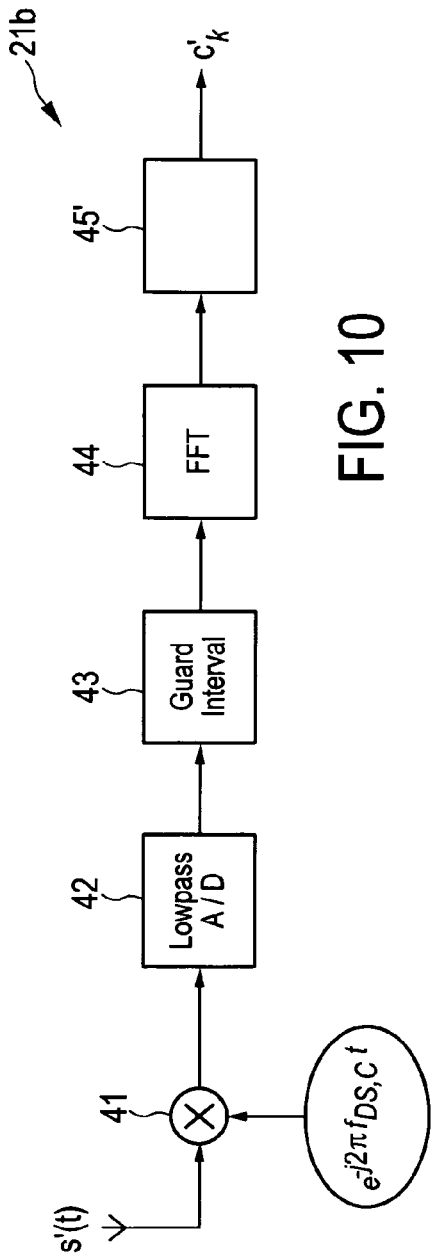
FIG. 10 shows a block diagram of a second embodiment of an OFDM decoder according to the present invention.

In another embodiment of an OFDM decoder 21b, as schematically depicted in FIG. 10, which is particularly applied when a segmented frame structure is used, the mixer 41 is adapted for mixing said received OFDM transmission signal s'(t) from a passband frequency down to a baseband frequency by use of a receiver mixing frequency $f_{DS,c}$, which has been explained above with reference to FIG. 7 to obtain complex time-domain samples of a data symbol, i.e. the data segments of the segmented frame are individually (or in groups) mixed with an individual receiver mixing frequency $f_{DS,c}$. In particular, the receiver mixing frequency $f_{DS,c}$ is selected such that common phase rotations of the OFDM subcarriers of a data symbol with respect to adjacent data symbols of the same data segment are avoided or compensated after mixing the received OFDM transmission signal s'(t) from a passband frequency down to a baseband frequency by use of said receiver mixing frequency $f_{DS,c}$. In this embodiment the zero remover 45' might have to be adopted to the need to remove zeros in the data symbols.

According to another embodiment the tuning positions of the data segments relative to the mixing frequency can be selected appropriately such that no unwanted phase rotations between the OFDM symbols appear in the receiver. Further, this alleviates time interpolation over multiple OFDM symbols that are of special importance in mobile OFDM systems such as an upcoming DVB-NGH (Next Generation Handheld) Standard.

Further, in an embodiment, applying a similar idea the lower and upper border frequencies of a data segment can be chosen appropriately such that, when the receiver tunes on the center frequency between said upper and lower boundary frequencies, no common phase rotations are generated.

Next, another embodiment shall be explained. Normally, the OFDM signal is generated in the equivalent lowpass and shifted up to the RF frequency by means of a mixing frequency $f_{c1}$ (on the transmitter side). This leads to the equations $$s(t) = \frac{1}{\sqrt{K_{total}}} \cdot Re\left\{ e^{j2\pi f_{c1} t} \cdot \sum_{m=0}^{\infty} \sum_{l=0}^{L_F-1} \sum_{k=K_{min}}^{K_{max}} c_{m,l,k} \cdot \Psi_{m,l,k}(t) \right\}$$

$$\psi_{m,l,k}(t) = \begin{cases} e^{j2\pi \frac{k'}{T_U}(t-\Delta-lT_S-mT_F)} & mT_F + lT_S \leq t \leq mT_F + (l+1)T_S \\ 0 & \text{otherwise} \end{cases},$$

which are equivalent to the definition of the OFDM signal in case of DVB-T2.

Within the receiver (in the complex domain), this can be described as $$s(t) = \frac{1}{\sqrt{K_{total}}} \cdot Re\left\{ e^{j2\pi f_{c1} t} \cdot e^{-j2\pi f_{DS,c2} t} \cdot \sum_{m=0}^{\infty} \sum_{l=0}^{L_F-1} \sum_{k=K_{min}}^{K_{max}} c_{m,l,k} \cdot \Psi_{m,l,k}(t) \right\}.$$

If the mixing frequency $f_{c1}$ of the transmitter is identical to the mixing frequency $f_{DS,c2}$ of the receiver, i.e. $f_{c1} = f_{DS,c2}$, which is normally the case for OFDM reception (particularly without the use of segmented OFDM), the two frequencies cancel each other and no phase rotations occur.

However, if the receiver is not tuned to the same frequency as the transmitter, which is normally the case for segmented OFDM reception, i.e. $f_{c1} \neq f_{DS,c2}$, an offset that depends on the tuning offset, i.e. $f_{c1} - f_{DS,c2}$, remains. This leads to a common phase rotation of $$\phi_{k_c} = 2\pi \cdot \Delta (f_{c1} - f_{DS,c2})$$

between the OFDM subcarriers of two adjacent OFDM symbols. This can be compensated by means of continual pilots that estimate this common phase error.

Alternatively, it does not have to be compensated if $\phi_{k_c}$ is multiples of $2\pi$. This can be reached if the tuning offset $f_{c1} - f_{DS,c2}$ is multiples of $$\frac{1}{T_U} \cdot \frac{T_U}{\Delta} = \frac{1}{\Delta},$$

where $$\frac{1}{T_U}$$

is the OFDM subcarrier spacing and $$\frac{\Delta}{T_U}$$

is the relative Guard Interval duration, and Δ the Guard Interval duration. Hence, if the frequency offset between the mixing frequency $f_{c1}$ of the transmitter and the mixing frequency $f_{DS,d2}$ of the receiver is multiples of the inverse of the Guard Interval duration, i.e.

$$\frac{1}{\Delta} = n \cdot (f_{c1} - f_{DS,c2})$$
$$n \in \ldots, -3, -2, -1, 0, 1, 2, 3, \ldots$$

is fulfilled, no correction within the receiver is required with respect to any frequency offset between said mixing frequencies.

Hence, the last embodiment for avoiding phase rotations in systems using segmented OFDM can be implemented by OFDM generators as exemplarily shown in FIGS. 2, 7 and 8, where the mixer 16 is adapted for mixing the signal output of unit 15 with the mixing frequency $f_{c1}$, which is equivalent to a complex multiplication of the signal by $e^{j2\pi f_{c1}t}$. On the receiver side, for implementing said last embodiment OFDM decoders as exemplarily shown in FIGS. 9 and 10 can be used, where the mixer 41 is adapted for mixing the received OFDM transmission signal (s'(t)) from a passband frequency down to a baseband frequency by use of the (data segment specific) mixing frequency $f_{DS,c2}$, which is equivalent to a complex multiplication of the signal by $e^{j2\pi f_{DS,c2}t}$.

In an exemplary implementation, in order to simplify the alignment, the bandwidth of the data slices is always a multiple of 32 OFDM subcarriers. This ensures that the number of payload subcarriers remains constant within a data slice over multiple OFDM symbols. Furthermore, in order to allow for the reception of the signal by means of a narrow-band (e.g. 1.7 MHz) tuner, its bandwidth shall not exceed a predetermined number of e.g. 1440 OFDM subcarriers (1.61 MHz for 1.116 kHz subcarrier spacing).

The bandwidth (or number of subcarriers per data slice) depends on the overall bandwidth of the transmission signal. The following table lists the number of data slice subcarriers $N_{DS}$ for the different channel bandwidths. They are chosen, by use of the above rule for the last embodiment, so that the bandwidth of the data slices is always maximum without exceeding 1.61 MHz. At the edge of the signal spectrum a guard band of 200 kHz is assumed.

| Channel Bandwidth | Data Slice subcarriers $N_{DS}$ | Number of Data Slices |
|---|---|---|
| 1.7 MHz | 1440 | 1 |
| 5 MHz | 1344 | 3 |
| 6 MHz | 1248 | 4 |
| 7 MHz | 1152 | 5 |
| 8 MHz | 1344 | 5 |
| 10 MHz | 1408 | 6 |
| 15 MHz | 1440 | 9 |
| 20 MHz | 1344 | 13 |

Furthermore, the bandwidth of the data slices ensures that no unwanted common phase rotations occur if the receiver tunes to the center frequency of each data slice. In other words, the lowest and highest frequencies of a data slice are selected such that the above condition is fulfilled and no phase rotations occur if the receiver tunes to the center frequency of said data slice. Otherwise, these phase rotations would have to be compensated by e.g. continual pilots or rotation of the phases, as, for instance, explained in the Implementation Guidelines of DVB-C2. Hence, according to this aspect of the present invention the OFDM symbols are mapped onto data segments each covering a bandwidth portion of the total channel bandwidth, wherein the bandwidth portions of the data segments are selected such that common phase rotations are avoided if a receiver tunes to the center frequency of the respective data segment. Preferably, the a frame structure is used so that the OFDM symbols are mapped onto frames of said frame structure having a channel bandwidth, wherein said frames have a payload portion being segmented in frequency domain into such data segments.

Alternatively, the correct receiver mixing frequency $f_{DS,c2}$ is determined in the transmitter so that it fulfils the above condition and is then signalled to the receiver. If the receiver then tunes to this receiver mixing frequency $f_{DS,c2}$, which must not necessarily the center frequency of the respective data slice, no common phase rotations occur.

The values are similar to the 8 k FFT mode of DVB-T2 in 8 MHz operation. Scaling is proposed to fit these parameters for L-Band and S-Band operation, where the subcarrier spacing of the DVB-T2 2 k FFT mode in 8 MHz operation is proposed.

The present invention is generally applicable to any data transmission systems that are faced with the above described problem of the generation of unwanted common phase rotations during the step of mixing on the transmitter side. This problem may particularly appear in any system using the concept of Absolute OFDM, as is applied in DVB-C2 broadcast systems. Hence, in all data transmission systems making use of the concept of Absolute OFDM the invention could be applied, preferably in broadcast systems. However, the problem also appears in other OFDM systems, in particular OFDM systems using segmented OFDM (as described above) and not using the concept of Absolute OFDM. Hence, also in those systems (e.g. according to DVB-NGH) the present invention can be applied.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An orthogonal frequency division multiplexing (OFDM) generation apparatus for generating OFDM transmission signals from OFDM symbols, each comprising a plurality of OFDM subcarriers, for transmission in a multi-carrier data transmission system, said apparatus comprising:

circuitry configured to perform an inverse discrete Fourier transform (IDFT) to transform an OFDM symbol into complex time-domain samples; and mix said complex time-domain samples of said OFDM symbol from a baseband frequency up to a passband frequency by use of a mixing frequency $f_c$ to obtain an OFDM transmission signal; wherein the OFDM transmission signal is represented mathematically by a summation of the OFDM subcarriers multiplied by a function $\psi(t)$ which is a product of a first exponential term independent of the mixing frequency $f_c$ and a second exponential term dependent on the mixing frequency $f_c$, and the mixing frequency $f_c$ is selected such that common phase rotations of the OFDM subcarriers of said OFDM symbol with respect to adjacent OFDM symbols of said OFDM transmission signal are avoided or compensated after said mixing.

2. The OFDM generation apparatus as claimed in claim 1, wherein the mixing frequency $f_c$ is selected as $$f_c = \frac{k_c}{T_U}$$

with the OFDM subcarrier $k_c$ at the mixing frequency $f_c$ fulfilling the condition that $$k_c \cdot \left(\frac{\Delta}{T_U}\right)$$

is an integer, wherein $T_U$ is the useful OFDM symbol duration and $\Delta$ is the duration of the guard interval.

3. The OFDM generation apparatus as claimed in claim 1, wherein the mixing frequency $f_c$ is selected as $$f_c = \frac{k_c}{T_U}$$

with the OFDM subcarrier $k_c$ at the mixing frequency $f_c$ being selected to be close or as close as possible to the central subcarrier among the subcarriers of said OFDM symbol, wherein $T_U$ is the useful OFDM symbol duration.

4. The OFDM generation apparatus as claimed in claim 1, wherein the mixing frequency $f_c$ is selected as $$f_c = \frac{k_c}{T_U}$$

with the OFDM subcarrier $k_c$ at the mixing frequency $f_c$ being selected as $$k_c = \left\lfloor \frac{K_{max} + K_{min}}{2} \cdot \frac{\Delta}{T_U} + \frac{1}{2} \right\rfloor \cdot \frac{1}{\left(\frac{\Delta}{T_U}\right)},$$

wherein $T_U$ is the useful OFDM symbol duration, $\Delta$ is the duration of the guard interval, $K_{min}$ is the carrier index of first active carrier having the lowest frequency and $K_{max}$ is the carrier index of last active carrier having the highest frequency.

5. The OFDM generation apparatus as claimed in claim 1, wherein the OFDM symbols are mapped onto data segments each covering a bandwidth portion of the total channel bandwidth, wherein the bandwidth portions of the data segments are selected such that common phase rotations are avoided if a receiver tunes to the center frequency of the respective data segment.

6. The OFDM generation apparatus as claimed in claim 1, wherein the bandwidth portions of the data segments are selected such that the frequency offset of the mixing frequency $f_c$ of the transmitter and a data segment specific mixing frequency of a receiver of the OFDM transmission signals are multiples of the inverse of a guard interval duration of the OFDM transmission signals.

7. An orthogonal frequency division multiplexing (OFDM) generation apparatus for generating OFDM transmission signals from OFDM symbols, each comprising a plurality of OFDM subcarriers, for transmission in a multi-carrier data transmission system, said apparatus comprising:

circuitry configured to perform an inverse discrete Fourier transform (IDFT) to transform an OFDM symbol into complex time-domain samples, wherein the OFDM symbols are mapped onto frames of a frame structure having a channel bandwidth, said frames having a payload portion being segmented in frequency domain into data segments each covering a bandwidth portion of said channel bandwidth, and wherein data symbols are mapped onto said data segments;

mix said complex time-domain samples of said OFDM symbol from a baseband frequency up to a passband frequency by use of a transmitter mixing frequency to obtain an OFDM transmission signal; and determine receiver mixing frequencies for mixing a received OFDM transmission signal from a passband frequency down to a baseband frequency by use of a receiver mixing frequency $f_{DS,c}$ to obtain complex time-domain samples of a data symbol in a receiver; wherein the OFDM transmission signal is represented mathematically by a summation of the OFDM subcarriers multiplied by a function $\psi(t)$ which is a product of a first exponential term independent of the mixing frequency $f_{DS,c}$ and a second exponential term dependent on the mixing frequency $f_{DS,c}$, and the receiver mixing frequencies are selected such that common phase rotations of the OFDM subcarriers of a data symbol with respect to adjacent data symbols of the same data segment are avoided or compensated after mixing a received OFDM transmission signal from a passband frequency down to a baseband frequency by use of said receiver mixing frequency.

8. The OFDM generation apparatus as claimed in claim 7, wherein the receiver mixing frequency $f_{DS,c}$ is selected as $$f_{DS,c} = \frac{k_{DS,c}}{T_U}$$

with the OFDM subcarrier $k_{DS,c}$ at the receiver mixing frequency $f_{DS,c}$ fulfilling the condition that $$k_{DS,c} \cdot \left(\frac{\Delta}{T_U}\right)$$

is an integer, wherein $T_U$ is the useful OFDM symbol duration and $\Delta$ is the duration of the guard interval.

9. The OFDM generation apparatus as claimed in claim 7, wherein the receiver mixing frequency $f_{DS,c}$ is selected as $$f_{DS,c} = \frac{k_{DS,c}}{T_U}$$

with the OFDM subcarrier $k_{DS,c}$ at the receiver mixing frequency $f_{DS,c}$ being selected to be close or as close as possible to the central subcarrier among the subcarriers of said data symbol, wherein $T_U$ is the useful OFDM symbol duration.

10. The OFDM generation apparatus as claimed in claim 7, wherein the receiver mixing frequency $f_{DS,c}$ is selected as $$f_{DS,c} = \frac{k_{DS,c}}{T_U}$$

with the OFDM subcarrier $k_{DS,c}$ at the receiver mixing frequency $f_{DS,c}$ being selected as $$k_{DS,c} = \left\lfloor \frac{K_{DS,max} + K_{DS,min}}{2} \cdot \frac{\Delta}{T_U} + \frac{1}{2} \right\rfloor \cdot \frac{1}{\left(\frac{\Delta}{T_U}\right)},$$

wherein $T_U$ is the useful OFDM symbol duration, $\Delta$ is the duration of the guard interval, $K_{DS,\,min}$ is the carrier index of first active carrier of the data segment, onto which the data symbol mixed with said mixing frequency is mapped, having the lowest frequency and $K_{DS,\,max}$ is the carrier index of last active carrier of the data segment, onto which the data symbol mixed with said mixing frequency is mapped, having the highest frequency.

11. The OFDM generation apparatus as claimed in claim 7, wherein the bandwidth portions of the data segments are selected such that common phase rotations are avoided if a receiver tunes to the center frequency of the respective data segment.

12. The OFDM generation apparatus as claimed in claim 7, wherein the frequency offset of the transmitter mixing frequency and the receiver mixing frequency $f_{DS,c}$ is multiples of the inverse of a guard interval duration of the OFDM transmission signal or the received OFDM transmission signal.

13. The OFDM generation apparatus as claimed in claim 1 or 7,
further comprising memory to store the mixing frequency.

14. The OFDM generation apparatus as claimed in claim 1 or 7,
wherein the circuitry is further configured to calculate the mixing frequency.

15. The OFDM generation apparatus as claimed in claim 1 or 7,
wherein the mixing frequency is selected dependent on the duration of a guard interval inserted between OFDM symbols and a useful OFDM symbol duration.

16. An orthogonal frequency division multiplexing (OFDM) generation method for generating OFDM transmission signals from OFDM symbols, each comprising a plurality of OFDM subcarriers, for transmission in a multi-carrier data transmission system, said method comprising:
inverse discrete Fourier transforming an OFDM symbol into complex time-domain samples; and
mixing said complex time-domain samples of said OFDM symbol from a baseband frequency up to a passband frequency by use of a mixing frequency to obtain an OFDM transmission signal; wherein
the OFDM transmission signal is represented mathematically by a summation of the OFDM subcarriers multiplied by a function $\psi(t)$ which is a product of a first exponential term independent of the mixing frequency and a second exponential term dependent on the mixing frequency, and
the mixing frequency is selected such that common phase rotations of the OFDM subcarriers of said OFDM symbol with respect to adjacent OFDM symbols of said OFDM transmission signal are avoided or compensated after said mixing.

17. An orthogonal frequency division multiplexing (OFDM) generation method for generating OFDM transmission signals from OFDM symbols, each comprising a plurality of OFDM subcarriers, for transmission in a multi-carrier data transmission system, said method comprising:
inverse discrete Fourier transforming an OFDM symbol into complex time-domain samples;
mixing said complex time-domain samples of said OFDM symbol from a baseband frequency up to a passband frequency by use of a transmitter mixing frequency to obtain an OFDM transmission signal, wherein the OFDM symbols are mapped onto frames of a frame structure having a channel bandwidth, said frames having a payload portion being segmented in frequency domain into data segments each covering a bandwidth portion of said channel bandwidth, and wherein data symbols are mapped onto said data segments; and
determining receiver mixing frequencies for mixing a received OFDM transmission signal from a passband frequency down to a baseband frequency by use of a receiver mixing frequency to obtain complex time-domain samples of a data symbol in a receiver; wherein
the OFDM transmission signal is represented mathematically by a summation of the OFDM subcarriers multiplied by a function $\psi(t)$ which is a product of a first exponential term independent of the receiver mixing frequency and a second exponential term dependent on the receiver mixing frequency, and
the receiver mixing frequencies are selected such that common phase rotations of the OFDM subcarriers of a data symbol with respect to adjacent data symbols of the same data segment are avoided or compensated after mixing a received OFDM transmission signal from a passband frequency down to a baseband frequency by use of said receiver mixing frequency.

18. Transmission apparatus for transmitting data within a multi-carrier data transmission system, comprising:
an OFDM generation apparatus according to claim 1 or 7 for generating OFDM transmission signals from OFDM symbols, each comprising a plurality of OFDM subcarriers, for transmission in a multi-carrier data transmission system; and
a transmitter for transmitting said OFDM transmission signals.

19. Transmission method for transmitting data within a multi-carrier data transmission system, comprising
- an OFDM generation method according to claim 16 or 17 for generating OFDM transmission signals from OFDM symbols, each comprising a plurality of OFDM subcarriers, for transmission in a multi-carrier data transmission system; and
- transmitting said OFDM transmission signals.

20. A non-transitory computer-readable recording medium that stores therein a computer program product, which, when executed by a processor, causes the method according to claim 16 or 17 to be performed.

21. The OFDM generation apparatus as claimed in claim 1, wherein the second exponential term of the function $\psi(t)$ is independent of time.

22. The OFDM generation apparatus as claimed in claim 1, wherein mixing frequency $f_c$ is selected such that the second exponential term of the function $\psi(t)$ is a multiple of $2\pi$.

23. The OFDM generation apparatus as claimed in claim 7, wherein the second exponential term of the function $\psi(t)$ is independent of time.

24. The OFDM generation apparatus as claimed in claim 7, wherein mixing frequency $f_{DS,c}$ is selected such that the second exponential term of the function $\psi(t)$ is a multiple of $2\pi$.

25. The OFDM generation method as claimed in claim 16, wherein the second exponential term of the function $\psi(t)$ is independent of time.

26. The OFDM generation method as claimed in claim 16, wherein the mixing frequency is selected such that the second exponential term of the function $\psi(t)$ is a multiple of $2\pi$.

27. The OFDM generation method as claimed in claim 17, wherein the second exponential term of the function $\psi(t)$ is independent of time.

28. The OFDM generation method as claimed in claim 17, wherein the receiver mixing frequency is selected such that the second exponential term of the function $\psi(t)$ is a multiple of $2\pi$.

\* \* \* \* \*